3,042,606
DESCALING SEA WATER
Murrell L. Salutsky, Silver Spring, and Grover L. Bridger, Baltimore, Md., assignors to W. R. Grace & Co., New York, N.Y., a corporation of Connecticut
Filed May 31, 1960, Ser. No. 32,753
7 Claims. (Cl. 210—28)

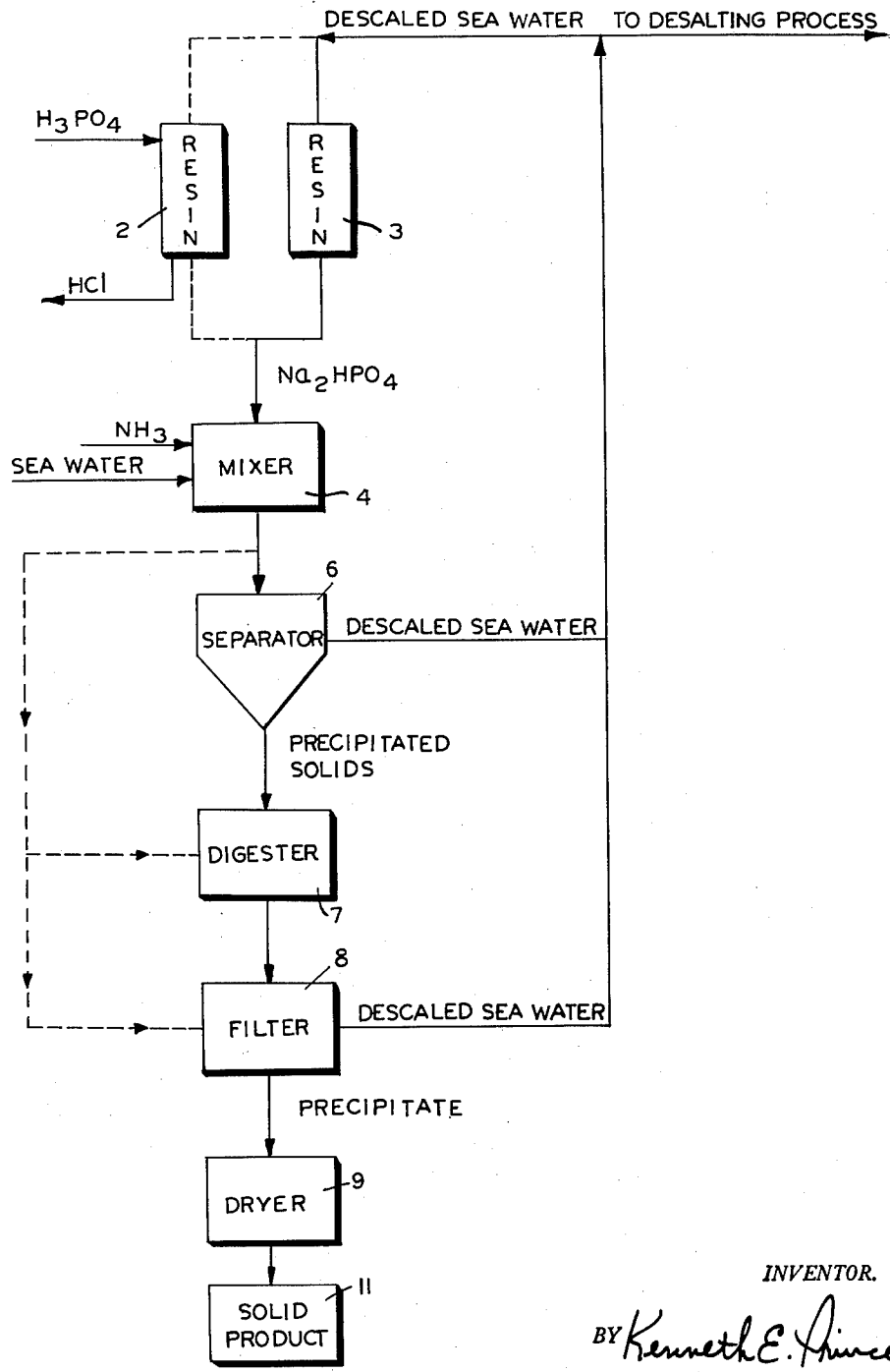

This invention relates to the removal of scale-forming elements from sea water. In one specific aspect it relates to the removal of all multivalent cations from sea water. In another specific aspect it relates to the treatment of sea water before processing into potable water.

Sea water contains a fairly high concentration of calcium and magnesium salts which are scale-forming. Upon conversion of sea water to fresh water by distillation these salts are, of course, left behind with the result that the concentration of solids within the apparatus increases and a large amount of scale is accumulated. This reduces the efficiency of the apparatus and requires periodic shutdowns for cleaning. What is desired is a process which will remove the scale-forming elements from sea water sufficiently low in cost to make it commercially feasible.

Certain phosphate compounds of magnesium, calcium, and other metals are quite insoluble in water. The formation of magnesium ammonium phosphate precipitate, for example, is used in quantitative analyses. The solubilities of these compounds can be reduced still further by the presence of a very slight excess of ammonia in the water.

If phosphoric acid and ammonia are added to sea water in the necessary proportions for the precipitation of magnesium ammonium phosphate, dicalcium phosphate and other phosphates, the following reactions will occur:

$$MgCl_2 + H_3PO_4 + 3NH_4OH + 3H_2O = MgNH_4PO_4 \cdot 6H_2O + 2NH_4Cl$$

$$CaCl_2 + H_3PO_4 + 2NH_4OH = CaHPO_4 \cdot 2H_2O + 2NH_4Cl$$

$$MCl_2 + H_3PO_4 + 3NH_4OH + xH_2O = MNHPO_4 \cdot xH_2O + 2NH_4Cl$$

where M signifies divalent elements such as Fe, Zn, Cu, Mn, and Ni. This has the disadvantage of a large ammonia requirement. It is seen that more than two-thirds of the ammonia added would be lost as dilute ammonium chloride in the sea water.

If, however, disodium phosphate and ammonia are added to sea water in the proper proportions the following reactions will take place:

$$MgCl_2 + Na_2HPO_4 + NH_4OH + 5H_2O = MgNH_4PO_4 \cdot 6H_2O + 2NaCl$$

$$CaCl_2 + Na_2HPO_4 + 2H_2O = CaHPO_4 \cdot 2H_2O + 2NaCl$$

$$MCl_2 + Na_2HPO_4 + NH_4OH + xH_2O = MNH_4PO_4 \cdot xH_2O + 2NaCl$$

In this case all of the ammonia added is recovered as metal ammonium phosphate and the resulting sea water has been softened by replacement of magnesium and calcium with sodium.

The major composition of ocean water is as follows:

| | P.p.m. | Lb./1,000 gal (Approx.) |
|---|---|---|
| Chlorine | 18,980 | 162 |
| Sodium | 10,561 | 90 |
| Magnesium | 1,272 | 10.9 |
| Sulfur | 884 | 7.6 |
| Calcium | 400 | 3.4 |
| Potassium | 380 | 3.25 |
| Strontium | 13 | 0.11 |
| Boron | 4.6 | 0.039 |
| Aluminum | 0.5 | 0.0043 |
| Phosphorus | 0.1 | 0.00086 |
| Iron | 0.02 | 0.00017 |
| Manganese | 0.01 | 0.000086 |
| Copper | 0.01 | 0.000086 |
| Zinc | 0.005 | 0.000043 |

It is estimated that 38 tons of metal phosphates and metal ammonium phosphates can be produced from 1,000,000 gallons of sea water. This is equivalent to about 13,000 tons per year for a plant processing one million gallons of sea water per day.

These compounds have many uses and can be further separated for various applications. The property of liberating ammonia when heated has resulted in the application of several of the metal ammonium phosphates as fire retardants in paints and plastics. Magnesium ammonium phosphate is commonly used in fire-resistant insulation. Zinc ammonium phosphate has been used in the preparation of artificial pearl essences for use in ornamental plastics. Both ferrous ammonium phosphate and zinc ammonium phosphate have been used to increase the corrosion-resistance of metals.

These compounds also exhibit some unusual properties that are believed to give them distinct advantages for some applications over conventional fertilizers. The metal ammonium phosphates do not burn plant vegetation or roots even when applied at very high rates. The solubilities of the compounds are of the same order as required by plant roots for efficient uptake. The compounds resist leaching and therefore are long-lasting sources of plant nutrients. The compounds can be used to furnish primary plant nutrients such as nitrogen and phosphorus, and also secondary and trace elements such as magnesium, calcium, iron, zinc, copper, manganese and others. Many of these compounds would prove valuable as ingredients of animal feeds.

It is an object of the present invention to remove the scale-forming elements from sea water.

It is also an object of the present invention to recover the multivalent cations from sea water in useable form.

It is a further object of the present invention to recover the trace elements from sea water in useable form.

Our method comprises contacting an ion exchange resin in sequence with phosphoric acid and a sodium chloride solution to yield separately hydrochloric acid solution and disodium phosphate solution, adding the disodium phosphate solution and ammonia in stoichiometric amounts to a calculated amount of sea water based on the composition of the sea water. The scale-forming elements are precipitated and separated from the mother liquor.

The invention will be further illustrated by reference to the single figure, which is a flow sheet of the process.

Phosphoric acid of about 4% concentration is passed through a bed of an ion exchange resin 2. It can be an anion exchange resin of the chloride type, or a cation exchange resin of the sodium type. Assuming we have an anion exchange resin of the chloride type, the phosphate ion is exchanged for the chloride ion and hydrochloric acid is discarded as a by-product. Sodium chloride solution is then passed through the resin 2. The effluent contains disodium phosphate and by this treatment the resin is regenerated for initial treatment with phosphoric acid.

It is preferable to use a plurality of resin beds in order to obtain a continuous process whereby disodium phosphate is formed in one resin while the other resin is being regenerated. The disodium phosphate is passed to the mixer 4 and mixed with ammonia and a predetermined amount of sea water. The amount of ammonia to be added is based on the magnesia content of the sea water. The precipitated metal phosphates and metal ammonium phosphates formed are passed to a separator 6 where the solids are allowed to settle. The supernatant liquid may be drawn off, or filtered, and passed to the desalting process or a portion may be used at the initial step of the process. The water is now entirely free of the scale-forming elements. The solids are withdrawn as slurry below.

The thick slurry residue may be passed to the digester 7 and heated to a temperature greater than 57° C. to convert the various salts to anhydrous or lower hydrate forms as shown in the following reactions:

$$MgNH_4PO_4.6H_2O = MgNH_4PO_4.H_2O + 5H_2O$$
$$CaHPO_4.2H_2O = CaHPO_4 + 2H_2O$$

This is desirable to reduce the amount of water in the product for handling purposes.

The heated slurry is filtered at the filter 8 and the filtrate may be combined with the descaled water at 6 or passed to the regeneration step as desired. The precipitate is then passed to the dryer 9 and dried at a temperature of 120° C. with negligible loss of ammonia.

It is also possible to pass the constituents from the mixer 4 to the digester 7 where all of the water and precipitate are heated to a temperature above 57° C. and then sent to the filter 8 from where the heated descaled water filtrate is passed to the desalting process.

It is further possible to pass the constituents from the mixer 4 directly to the filter 9 from where the descaled water can be sent to the desalting process.

For some purposes it would be desirable to wash the solid product substantially free of soluble salts, but for most applications the presence of some soluble salts would be permissible. The final product contains approximately 7.7% nitrogen, 46.7% $P_2O_5$, 20% MgO, and smaller proportions of the various secondary and trace elements. By the present process the sea water would have at least 97% of its scale-forming elements removed.

As has been mentioned, an alternative process could be based on the use of cation exchangers at 2 and 3. In this case a cationic resin in the sodium form would be treated with phosphoric acid and disodium phosphate removed as a product stream. Descaled water from separator 6 and filter 8 may be used to regenerate the resin.

Instead of adding ammonia and disodium phosphate directly to sea water, it may be preferred to mix the disodium phosphate with ammonia before adding to the sea water.

The phosphoric acid could be from either electric furnace production or wet process production. The latter would probably be more economical in most locations.

Under special circumstances other sources of disodium phosphate might be more economical; for example, if waste disodium phosphate, sodium hydroxide, sodium carbonate, or sodium bicarbonate were available from nearby chemical processes they could be used to advantage. Also, there might be circumstances under which it would be economical to make disodium phosphate directly from sodium chloride and phosphoric acid.

It is obvious that a concentrated solution of sodium chloride can be used efficiently at the initial step. Waste brine resulting from the desalting process can be recycled and used for this purpose as indicated in the FIGURE.

To further illustrate this invention, the following examples are given:

EXAMPLE I

A 4.64 gram sample of 86.84% $H_3PO_4$ was diluted with 100 ml. of fresh water and passed through a column of Dowex IX8 ion exchange resin containing about 70 g. of resin (wet basis) in the chloride form. The column was washed with fresh water until neutral. The column was eluted with 400 ml. of 3% NaCl solution. To this eluent was added 3 ml. of 28% $NH_4OH$ and the resulting solution was added slowly with stirring to a liter of sea water. The mixture was allowed to stand overnight. It was then filtered, washed with fresh water, and the residue was air-dried overnight at room temperature. Analysis gave the following results:

*Composition of Product*

| | |
|---|---|
| Percent N | 5.15 |
| Percent $P_2O_5$ | 29.20 |
| Percent MgO | 16.37 |
| Percent CaO | 1.50 |

On the basis of the analyses, the product was composed

97.83% [1]

EXAMPLE II $MgNH_4PO_2.6H_4O$ (200 g.) was placed in a 2 liter beaker fitted with a stirrer and heater. Demineralized water (1000 ml.) was added to the $MgNH_4PO_4.6H_2O$. The contents of the beaker were stirred and the temperature raised to 90° C. The mixture was digested for one hour. During this digestion period, the mixture temperature was raised to 100° C. where it remained for five minutes. After filtering, the wet cake was placed in an oven operating at 70° C. until constant weight was established. A product weighing 123.1 g. was obtained. A theoretical yield would be 126.6 g. based on the sole formation of $MgNH_4PO_4.H_2O$. Final analysis of the dehydrated product gave the following results:

| | |
|---|---|
| Percent N | 8.70 |
| Percent $P_2O_5$ | 45.50 |
| Percent MgO | 27.33 |

We claim:

1. A method for removing scale-forming compounds from sea water and recovering said compounds in useable form which comprises contacting an ion exchange resin in sequence with phosphoric acid and a sodium chloride solution to yield separately hydrochloric acid solution and disodium phosphate solution, adding said disodium phosphate solution and ammonia in stoichiometric amounts to a predetermined amount of sea water to precipitate the scale-forming elements, and separating the precipitates from the mother liquor.

2. A method for removing scale-forming compounds from sea water and recovering said compounds in useable form which comprises contacting an ion exchange resin in sequence with phosphoric acid and a sodium chloride solution to yield separately hydrochloric acid solution and disodium phosphate solution, adding said disodium phosphate solution and ammonia in stoichiometric amounts to a predetermined amount of sea water to precipitate the scale-forming elements, separating the precipitate from the sea water, and returning a portion of the descaled

[1] No correction for gypsum, i.e. $CaSO_4.2H_2O$.

water to the initial step, above, to regenerate said ion exchange resin.

3. Method for removing scale-forming compounds from sea water which comprises (a) contacting an anion exchange resin of the chloride type with phosphoric acid thereby converting it to the phosphate type and releasing hydrochloric acid, (b) treating said resin with sodium chloride solution to convert the resin back to chloride form and release disodium phosphate, (c) adding said disodium phosphate and ammonia in stoichiometric amounts to a predetermined amount of sea water to precipitate the divalent cations, (d) separating the precipitated solids from the mother liquor, (e) recycling a portion of the descaled water for use in treatment step (b) above, and (f) recovering said precipitated solids in useable form.

4. Method for removing scale-forming compounds from sea water which comprises (a) contacting a cation exchange resin of the sodium type with phosphoric acid to form disodium phosphate, (b) adding said disodium phosphate and ammonia in stoichiometric amounts to a predetermined amount of sea water to precipitate the divalent cations, (c) separating the precipitated solids from the mother liquor, (d) recycling a portion of the descaled sea water for use in regenerating said cation exchange resin, and (e) recovering said precipitated solids in useable form.

5. Method for removing scale-forming compounds from sea water which comprises (a) contacting an anion exchange resin of the chloride type with phosphoric acid thereby converting it to the phosphate type and releasing hydrochloric acid, (b) treating said resin with sodium chloride solution to reconvert it to the chloride form and release disodium phosphate, (c) adding said disodium phosphate and ammonia in stoichiometric amounts to a predetermined amount of sea water heated to a temperature greater than 57° centigrade to precipitate phosphate and ammonium phosphate salts of the divalent cations in said sea water, (d) separating the precipitated solids from the mother liquor, (e) recycling a a portion of the descaled sea water for use in treatment step (b) above, and (f) recovering the precipitate in useable form.

6. Method for removing scale-forming elements from sea water which comprises adding disodium phosphate and ammonia in stoichiometric amounts to a predetermined amount of sea water to precipitate phosphate and ammonium phosphate salts of the scale-forming elements and separating the precipitated solids from the mother liquor.

7. Method for removing scale-forming elements from sea water and recovering said elements in useable form which comprises adding an orthophosphate salt of a monovalent metal and ammonia in stoichiometric amounts to a predetermined amount of sea water to precipitate phosphate and ammonium phosphate salts of the scale-forming elements, and separating the precipitated solids from the mother liquor.

References Cited in the file of this patent
UNITED STATES PATENTS
2,782,162     Liddell  ---------------- Feb. 19, 1957